United States Patent Office 2,785,540
Patented Mar. 19, 1957

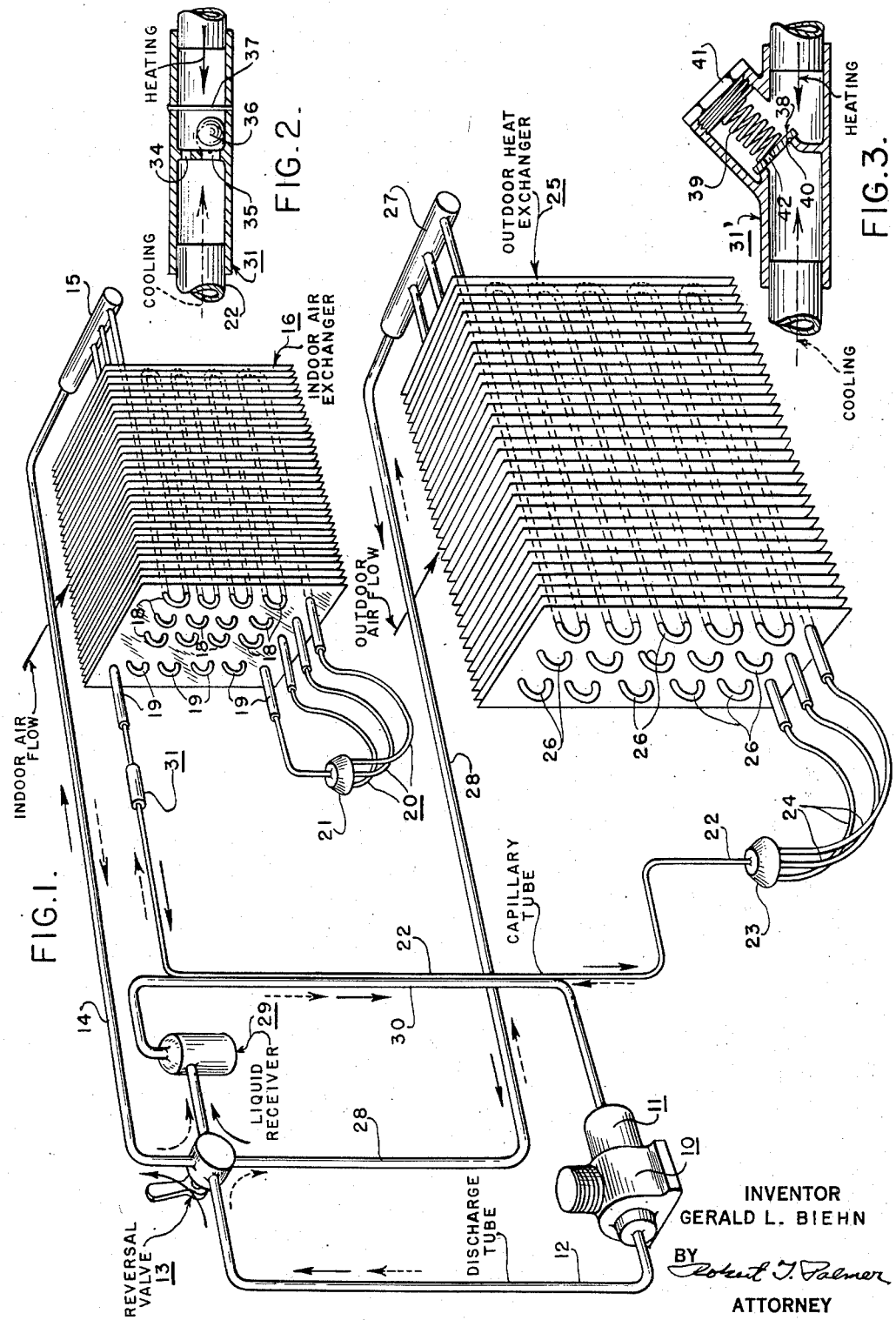

2,785,540
HEAT PUMPS

Gerald L. Biehn, Needham, Mass., assignor to Westinghouse Electric Corporation, East Pittsburgh, Pa., a corporation of Pennsylvania Application September 30, 1953, Serial No. 383,251

3 Claims. (Cl. 62—115)

This invention relates to heat pumps used for cooling air in summer and for heating air in winter.

In air-to-air heat pumps, outdoor air heat exchangers function as condensers during cooling operation, and as evaporators during heating operation, and indoor air heat exchangers function as evaporators during cooling operation, and as condensers during heating operation. This requires two-way expansion of the refrigerant. Some heat pumps use complicated two-way expansion means consisting of pairs of expansion valves with by-passes for use around the inactive valves. The E. R. Wolfert Patent No. 2,342,566 discloses a simple, inexpensive two-way expansion means consisting of a single capillary tube connected between the indoor air and outdoor air heat exchangers. A disadvantage of such a capillary tube expansion means is that its resistance to refrigerant flow determined by its length and inner diameter, has to be selected for a particular charge of refrigerant at some selected intermediate load. As the load increases above or decreases below the intermediate load, the efficiency of the heat pump decreases.

The air cooling loads are usually much larger than the air heating loads, and if a charge of refrigerant selected for an intermediate air cooling load is supplied during air heating operation to the outdoor air heat exchanger acting as evaporator, the charge of refrigerant will be larger than can be evaporated by the outdoor air heat exchanger, resulting in liquid overflowing the receiver and flooding back into the compressor. Therefore, for most efficient operation, the two-way expansion means should offer more resistance to flow so as to pass less refrigerant into the outdoor air heat exchanger during air heating operation than is supplied into the indoor air heat exchanger acting as evaporator during air cooling operation.

This invention retains the advantages of using a single capillary tube as a two-way expansion means, and provides it with an additional restriction which is used only during air heating operation.

In one embodiment of this invention, a refrigerant charge and a capillary tube are selected for an average load during air cooling operation, and an additional restriction is automatically connected in series with the capillary tube when the heat pump is switched from air cooling to air heating operation, the additional restriction adding sufficient resistance to reduce the refrigerant charge in the outdoor air heat exchanger to that proper for an average air heating load.

Preferably, an auxiliary heat exchanger is associated with the indoor air heat exchanger, and is connected through the additional restriction to the capillary tube. The auxiliary heat exchanger serves as a sub-cooler during air heating operation, and stores the excess liquid, increasing the sub-cooling, and preventing the flooding of the indoor air heat exchanger acting as a condenser at this time.

An object of this invention is to provide a two-way expansion means for a heat pump which offers more resistance to the flow of refrigerant during air heating operation than during air cooling operation.

Another object of this invention is to use a capillary tube as a two-way expansion means for a heat pump, and to use with the capillary tube during air heating operation only, an additional restriction to refrigerant flow.

Another object of this invention is to use to a two-way expansion means for a heat pump, having a greater resistance to flow of refrigerant during air heating operation than during air cooling operation, and to use an auxiliary indoor air heat exchanger for storing the refrigerant backed-up by the expansion means during air heating operation.

This invention will now be described with reference to the drawings, of which:

Fig. 1 is a diagrammatic view of a heat pump embodying this invention;

Fig. 2 is an enlarged side elevation, in section, of an additional restriction in the form of a check valve which may be used in the heat pump, and Fig. 3 is an enlarged side elevation, in section, of another check valve which may be used.

The hermetically sealed refrigerant compressor 10 driven by the built-in electric motor 11, has its discharge side connected through the tube 12 to a conventional reversal valve 13. During air heating operation, the valve 13 is adjusted to route the refrigerant through the tube 14 to the header 15 of the indoor air heat exchanger 16. The solid line arrows alongside the tubing indicate the direction of the flow of refrigerant at this time. During air cooling operation, the valve 13 is adjusted to route the refrigerant through the tube 28 to the header 27 of the outdoor air heat exchanger 25. The dashed-line arrows alongside the tubing indicate the direction of refrigerant flow at this time.

The indoor air heat exchanger 16 has the three vertical rows 18 of finned tubes forming the main indoor air heat exchanger, and has the additional vertical row 19 of finned tubes located upstream with respect to the flow of indoor air, of the rows 18. The tubes of the row 19 are exposed to the cooler air and act as a sub-cooler during air heating operation. The tubes of the row 19 act as a pre-evaporator during air cooling operation.

The bottom tubes of the rows 18 are connected through the distributor tubes 20 to the distributor 21 which is connected to the bottom tube of the row 19. The top tube of the row 19 is connected through the check valve 31 to one end of the capillary tube 22, the other end of which is connected to one side of the distributor 23, the other side of which is connected through the distributor tubes 24 to the bottom tubes of the vertical rows 26 of tubes of the outdoor air heat exchanger 25. The top tubes of the rows 26 are connected through the header 27 and tube 28 to the reversal valve 13 which is connected through the discharge tube 12 to the discharge side of the compressor 10, and through the liquid receiver 29 and suction tube 30 to the suction side of the compressor.

During air cooling, a large condenser is desired for dissipating sufficient heat to the outdoor air, and a smaller evaporator is desired for providing a large difference between the indoor air and evaporating temperatures for dehumidifying the indoor air. During air heating, a large evaporator is desired for absorbing sufficient heat from the outdoor air, and a smaller condenser is desired for providing a large difference between the indoor air and condensing temperatures for heating the indoor air. Therefore, the outdoor air heat exchanger is the larger as illustrated by Fig. 1.

Two forms of check valves which may be used are shown by Figs. 2 and 3. The check valve of Fig. 2 is circular in cross-section, and has a central vertical partition with a small orifice 34 above a large circular orifice 35. The metal ball 36 resting on the bottom of the valve is lined up with the large orifice 35, the pin 37 limiting the outer movement of the ball. During air heating operation, the flow of refrigerant is in a direction to cause the ball to roll towards the orifice and close it. This leaves only the small orifice 34 for the refrigerant to flow through with the result that the resistance offered by the restricted orifice 34 plus that offered by the capillary tube, make up a total resistance suitable for air heating operation. During air cooling, the refrigerant flows in the opposite direction so that the ball 36 is moved away from the orifice 35. The refrigerant then flows through both orifices 34 and 35, which together provide the reduced resistance suited for air cooling operation.

The check valve 31' of Fig. 3 has a valve plate 38 urged by the coiled spring 39 held between the plate 38 and the removable cover 41, towards the valve seat 40. The plate 38 has a small central orifice 42. During air heating, the flow of refrigerant is in a direction to cause the plate 38 to be seated as illustrated by Fig. 3, so that the refrigerant can flow only through the orifice 42 which adds the additional resistance suited for air heating operation. During air cooling, the flow of refrigerant in the opposite direction unseats the plate 38 so that there is flow under it as well as through the orifice 42, the reduced resistance suited for air cooling operation being provided.

*Operation of Fig. 1.—Air cooling operation*

During air cooling operation, the reversal valve routes the refrigerant in the direction indicated by the dashed-line arrows along the tubing. The refrigerant flows from the compressor discharge through the reversal valve 13, through the tube 28 and header 27 into the top tubes of the outdoor air heat exchanger 25 acting as a condenser at this time, then out the bottom tubes of he heat exchanger 25, acting as sub-cooler tubes, then through the distributor tubes 24 and header 23 into the capillary tube 22. The refrigerant then flows through the capillary tube 22 and check valve 31 into the top tube of the row 19 of tubes of the indoor heat exchanger, which row acts at this time as a pre-evaporator. The refrigerant then flows through the tubes of the row 19 and out of the bottom tube of that row and through the header 21 and distributor tubes 20 through which the refrigerant is further expanded into the tubes of the rows 18 of the indoor air heat exchanger. The tubes of the rows 18 serve as the main evaporator at this time. The refrigerant then flows from the top tubes of the rows 18 through the header 15, the tube 14, the reversal valve 13, the receiver 29 and tube 28 to the suction side of the compressor 10.

During air cooling operation, the check valve 31 permits free flow of refrigerant through it so that the large volume of refrigerant required for the larger average air cooling load is permitted to flow into the indoor air heat exchanger acting as evaporator.

During air cooling operation, the liquid in the capillary tube 22 is cooled by the vapor in the suction tube 29 before the liquid reached the indoor air heat exchanger acting as evaporator at this time.

*Operation of Fig. 1.—Air heating operation*

During air heating, the refrigerant flows from the compressor discharge, through the reversal valve 13, through the tube 14 and header 15 into the top tubes of the rows 18 of the indoor air heat exchanger 16, then out the bottom tubes of the rows 18 and through the distributor tubes 20 into the header 21, then from the header 21 into the bottom tube of the auxiliary row 19 of the indoor air heat exchanger, then out the top tube of the row 19, through the check valve 31, then through the capillary tube 22 into the header 23, and then through the distributor tubes 24 into the bottom tubes of the three vertical rows 26 of the outdoor air heat exchanger 25.

The outdoor air heating exchanger 25 at this time acts as an evaporator, outdoor air being moved over its surfaces by a fan which is not illustrated. The expanded refrigerant passes out of the top tubes of the rows 26 into the header 27, then through the tube 28, reversal valve 13, receiver 29 and suction tube 30 to the suction side of the compressor 10.

The liquid in the capillary tube 22 which extends in heat exchange contact with the suction tube 30, adds heat to the suction gas, which heat appears as superheat in the indoor air heat exchanger 16.

The three rows 18 of tubes of the indoor air heat exchanger act as a condenser during air heating operation, the indoor air being circulated by a fan which is not illustrated, over their surfaces, and absorbing the latent heat of vaporization and some sensible heat from the refrigerant as it condenses from a gas to a liquid. The sub-cooler row 19 of tubes gives up some heat to the indoor air. Since it is upstream with respect to the flow of indoor air, of the rows 18 of tubes, it is exposed to cooler air, and sub-cools the liquid refrigerant about 25° F., thus increasing the heat pumping effect and the capacity of the system.

The check valve 31 by adding additional resistance in series with the capillary tube, prevents the liquid from flowing from the high pressure side of the system where it is needed for sub-cooling, to the low pressure side where it is not needed. The excess liquid over that required by the lighter loads during air heating operation, is backed-up by the check valve, and stored in the sub-cooler row 19 of tubes. By storing this excess liquid, the sub-cooler row 19 prevents it from flooding the lower tubes 18 of the indoor air heat exchanger, thus maintaining the effectiveness of the latter as a condenser.

If the check valve was not used during air heating operation, more refrigerant than is required by the reduced loads would pass to the outdoor air heat exchanger acting as evaporator, resulting in liquid overflowing the receiver and flooding back into the compressor. If the receiver was made large enough to hold all of the excess liquid, the lubricating oil would be trapped.

While one embodiment of the invention has been described for the purpose of illustration, it should be understood that the invention is not limited to the exact apparatus and arrangement of apparatus illustrated, since modifications thereof may be suggested by those skilled in the art without departure from the essence of the invention.

What is claimed, is:

1. A heat pump comprising a refrigerant compressor, an indoor air heat exchanger, an outdoor air heat exchanger, means including a two-way expansion means connecting said exchangers, and means including a reversal valve for routing refrigerant from said compressor to said indoor heat exchanger during air heating operation, and to said outdoor heat exchanger during air cooling operation, said expansion means comprising a single relatively long, relatively small passage, means forming a second passage in series with said passage, and means operated by the flow of refrigerant for constricting said second passage when said reversal valve routes refrigerant from said compressor to said indoor air heat exchanger.

2. A heat pump comprising a refrigerant compressor, an indoor air heat exchanger, an outdoor air heat exchanger, means including a two-way expansion means connecting said exchangers, and means including a reversal valve for routing refrigerant from said compressor to said indoor heat exchanger during air heating operation, and to said outdoor heat exchanger during air cooling operation, said expansion means comprising a single capillary tube, a check valve in series with said tube, the check valve having two passages therethrough, one a relatively small passage, and the other a relatively large passage, and means for closing the relatively large passage when said reversal valve routes refrigerant from said compressor to said indoor air heat exchanger.

3. A heat pump as claimed in claim 2 in which the means for closing the relatively large passage is operated by the flow of refrigerant.

References Cited in the file of this patent

UNITED STATES PATENTS

| | | |
|---|---|---|
| 2,342,566 | Wolfert | Feb. 22, 1944 |
| 2,388,314 | Eisinger | Nov. 6, 1945 |
| 2,451,385 | Groat | Oct. 12, 1948 |
| 2,694,296 | Prosek et al. | Nov. 16, 1954 |